(12) United States Patent
Reasoner et al.

(10) Patent No.: US 6,392,446 B1
(45) Date of Patent: May 21, 2002

(54) DEVICE AND METHOD FOR REDUCING A TIME CONSTANT OF A DATA BUS DURING A VOLTAGE TRANSITION

(75) Inventors: Kelly J. Reasoner, Fort Collins; Duane L. Harmon, Loveland; Robert H. Bohl, Fort Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/872,296

(22) Filed: Jun. 1, 2001

(51) Int. Cl.[7] .................................. H03K 5/19
(52) U.S. Cl. ..................... 327/20; 327/52; 327/227

(58) Field of Search ............................. 327/20, 52, 62, 327/89, 227, 229, 280, 335, 336, 389, 392, 398, 561–563; 326/86, 30

(56) References Cited

U.S. PATENT DOCUMENTS

| 5,770,967 A | * | 6/1998 | Alzati et al. ................ 327/365 |
| 6,147,526 A | * | 11/2000 | Skelton et al. .............. 327/134 |
| 6,320,406 B1 | * | 11/2001 | Morgan et al. ............... 326/14 |
| 6,321,525 B1 | * | 11/2001 | Rogers ....................... 60/39.03 |

* cited by examiner

Primary Examiner—My-Trang Nu Ton

(57) ABSTRACT

Method and device for reducing the time constant of a system having a conductor connected thereto by connecting an impedance between the conductor and a potential as the voltage on said conductor exceeds a preselected value.

29 Claims, 3 Drawing Sheets

DEVICE AND METHOD FOR REDUCING A TIME CONSTANT OF A DATA BUS DURING A VOLTAGE TRANSITION

TECHNICAL FIELD OF THE INVENTION

The present invention relates to improving data transmissions on a data bus and, more particularly, to reducing the time constant associated with the data bus during voltage transition periods.

BACKGROUND OF THE INVENTION

Some data busses, such as inter-integrated circuit ($I^2C$) busses, have limited capabilities due to high time constants associated With the data busses. The $I^2C$ bus has two conductors referred to as a clock signal line and a data signal line. The voltages of both of these lines are pulled high via pull up resistors connected to a voltage source. When a device uses the bus, the device pulls the voltages on the lines down in a preselected sequence to indicate that it is preparing to transmit data on the bus. Data is then transmitted via voltage transitions on the lines. When the device is finished using the data bus, the device releases the lines so that they may float or otherwise be pulled to high voltages in a preselected sequence by the pull up resistors in conjunction with the voltage source.

The voltages on the lines of an $I^2C$ bus float when they are not pulled to a low voltage. This floating is due to open collector devices connected to the lines. In order to assure that the lines float to a high voltage when they are not being pulled to a low voltage by a device connected to the lines, the lines are connected to a direct current power supply via pull up resistors.

If the voltages on the lines are not able to float high within a preselected period, the data bus will not operate properly. One problem that may occur is that devices connected to the data bus will not be signaled that the data bus is available for data transmission. Another problem that may occur is that voltage transitions that are meant to be representative of data transfers may be interpreted incorrectly. For example, if voltage transitions on the clock signal data line take too long to complete, data may not be properly transmitted on the data bus. The same may occur if voltage transitions on the data signal line take too long to complete. Furthermore, if the voltage transition from one line is slower than the other line, the aforementioned voltage transition sequences may not occur correctly, which will prevent data from being properly transmitted via the data bus.

One cause of an increase in the voltage transition time on the data bus is due to an increased time constant associated with the data bus. For example, if the capacitance associated with the data bus increases, the time constant associated with the data bus will increase. Accordingly, the above-described problems associated with excessive time for the voltage transitions may occur. In one embodiment of an $I^2C$ bus, the capacitance is limited to approximately 433 picofarads. Should the capacitance increase beyond this amount, the data bus may be rendered dysfunctional as described above.

Increases in capacitance occur for many reasons. One cause of an increase in capacitance is due to the addition of more or longer data lines. For example, if the data lines are long, their capacitance will increase, which will cause the time constant associated with the data bus to increase. Another cause of an increase in capacitance is due to the addition of devices to the data bus. All devices added to the data bus have an internal capacitance. As more devices are added to the data bus, their internal capacitance adds, which increases the time constant associated with the data bus.

SUMMARY OF THE INVENTION

The present invention is directed toward a device for reducing the time constant of a system having a conductor connected thereto as a voltage on the conductor transitions from a first voltage to a second voltage. The device may comprise a voltage comparator, an impedance, a switch, and a timer.

The voltage comparator may have an input that is operatively connected to the conductor. The voltage at the voltage comparator output is transitionable between a first voltage and a second voltage when the voltage of the conductor exceeds a first preselected voltage.

The switch may be operatively connected to the voltage comparator output and the impedance. The switch connects the impedance to the conductor when the switch is in a first switch state and disconnects the impedance from the conductor when the switch is in a second switch state. Accordingly, the time constant of the system is reduced when the switch is in the first switch state.

The timer may be operatively connected to the switch and the first voltage comparator. The timer is transitionable from a timer first state to a timer second state for a preselected period upon the transition of the voltage at the a voltage comparator output from the first voltage to the second voltage.

The first switch state occurs when the voltage at the first voltage comparator output transitions from the first voltage to the second voltage. The second switch state occurs when the timer transitions to the second timer state.

DETAILED DESCRIPTION OF A PREFERRED EMBODIMENT

The present invention is directed toward a device and method for reducing the time constant of a system having a conductor connected thereto as a voltage on the conductor transitions from a low potential to a high potential, wherein a first impedance is connected between the conductor and a potential. The invention may comprise monitoring the voltage on the conductor and connecting a second impedance in parallel with the first impedance when the voltage on the conductor exceeds a first preselected value. The second impedance is disconnected from the first impedance when the voltage on the conductor exceeds a second preselected value.

Figure 1:
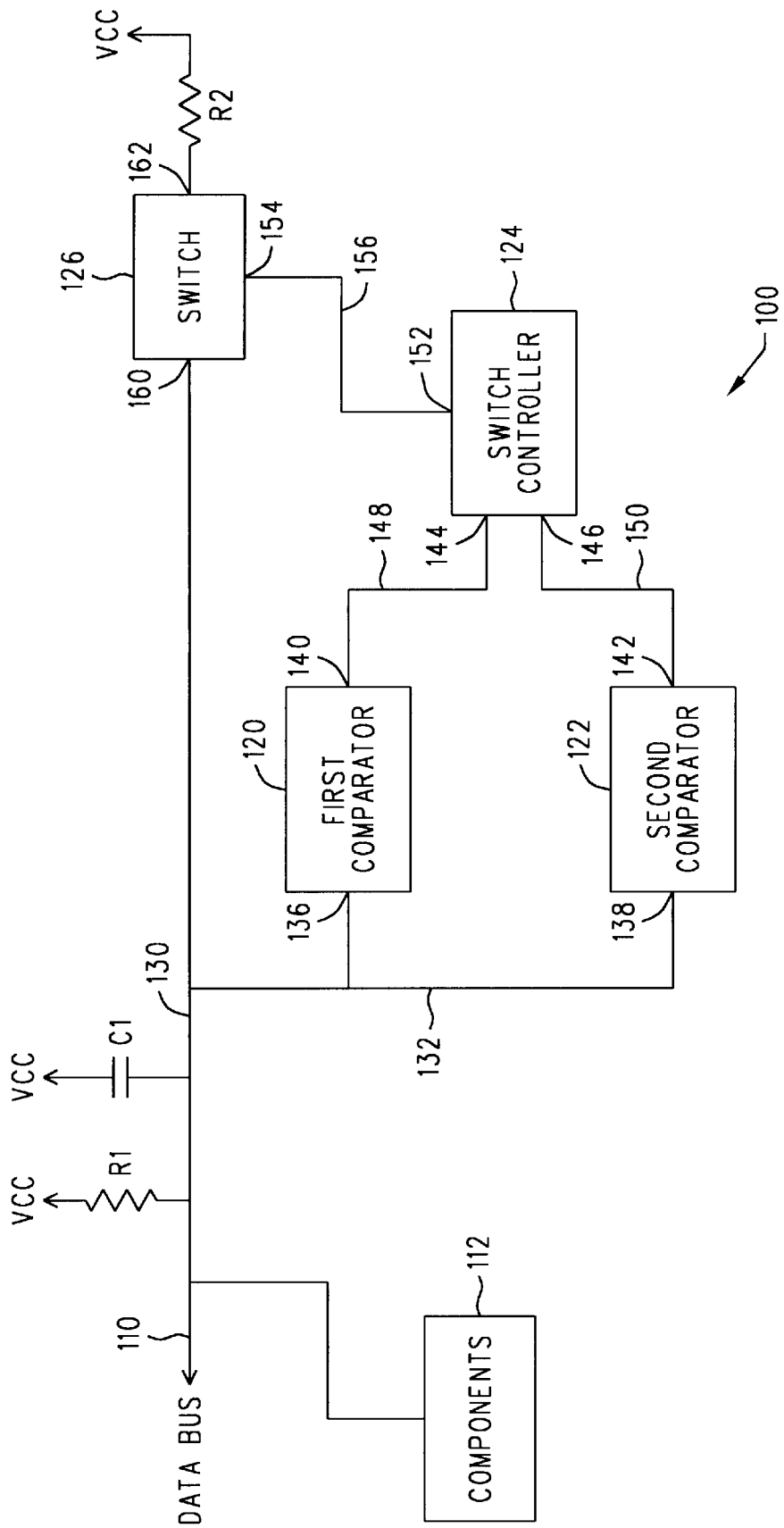
FIG. 1 is an exemplary simplified schematic illustration of a device for increasing the rise time of a data bus of the present invention.

A non-limiting embodiment of an impedance changing circuit 100 is illustrated in FIG. 1. A more detailed schematic illustration of the impedance changing circuit 100 will be described below with reference to FIG. 2.

The impedance changing circuit 100 illustrated in FIG. 1 is electrically connected or otherwise operatively connected to a conductor 110 or line of a data bus. The data bus illustrated in FIG. 1 may, as a non-limiting example, be an inter-integrated circuit ($I^2C$) bus. More specifically, the conductor 110 may be either the serial data line or the serial clock line of an $I^2C$ bus. A component or device 112 is electrically connected to the conductor 110 and is typical of a component that may normally be connected to an I²C bus. Data and instructions are transmitted via the conductor 110 and, thus, the data bus, by causing the voltage potential on the conductor 110 to transition. The voltage potential is relative to a common node, such as a ground node, not shown in FIG. 1.

In the non-limiting example provided herein, the device 112 and other devices connected to the conductor 110 are open collector devices. Therefore, in order to transition the voltage on the conductor 110 for data transmissions, the device 112 pulls the voltage on the conductor 110 to a low potential or a low state. Upon completion of data transfers, the device 112 lets the voltage on the conductor 110 float to a high potential or a high state. More specifically, the device 112 effectively connects the conductor 110 to a low potential, such as ground, to achieve the low state. In order to achieve the high state, the device 112 becomes a high impedance load so the voltage on the conductor 110 may float. The voltage on the conductor 110 is then pulled to a high state (VCC) by a pull up resistor R1, which is connected between the voltage VCC and the conductor 110.

The conductor 110 has an inherent capacitance associated therewith. For illustration purposes, the capacitance is shown as a capacitor C1 connected in parallel with the resistor R1. The capacitance is due to several factors, such as the length and other physical properties of the conductor 110 along with the internal capacitance of devices electrically connected to the conductor 110, such as the device 112. Accordingly, as the length of the data bus and, thus, the conductor 110 is increased, the capacitance associated therewith increases. Likewise, as more devices are connected to the conductor 110, the capacitance associated with the conductor 110 increases.

The above-described capacitance C1 in conjunction with the pull up resistor R1 affects the time constant of the conductor 110. As more devices are connected to the conductor 110 or as the length of the conductor 110 increases, the capacitance C1 increases. The increased capacitance C1, in turn, increases the time constant of the conductor 110. Accordingly, the time required for the voltage on the conductor 110 to float and, thus, transition from a low state to a high state increases. If the transition time increases beyond preselected specifications, data will not be properly transmitted on the data bus. As described in detail below, the impedance changing circuit 100 serves to reduce the time constant of the conductor 110 by reducing the impedance between VCC and the conductor 110 during voltage transitions. As is described in greater detail below, the impedance changing circuit 100 adds a resistor in parallel to the resistor R1 during low to high voltage transitions on the conductor 110.

In the non-limiting embodiment of the impedance changing circuit 100 described herein, the impedance changing circuit may have a first comparator 120, a second comparator 122, a switch controller 124, a switch 126, and a resistor R2. It should be noted that the impedance changing circuit 100 may have other electronic components, not shown in FIG. 1, associated therewith. An embodiment of the impedance changing circuit 100 having the other electronic components associated therewith is described below with reference to FIG. 2.

The impedance changing circuit 100 may be electrically connected to the data bus by a line 130 that connects to the conductor 110. The term line as used herein includes, but is not limited to, conductors and the like used for data transmissions or other signal transmissions. Both the first comparator 120 and the second comparator 122 may be electrically connected to the line 130 by a line 132. More specifically, the line 132 may be electrically connected to an input 136 of the first comparator 120 and an input 138 of the second comparator 122.

The first comparator 120 has an output 140, wherein the voltage at the output 140 is transitionable between a first voltage and a second voltage depending on the voltage at the input 136. More specifically, when the voltage at the input 136 exceeds a first preselected threshold voltage, the voltage at the output 140 transitions between the first voltage and the second voltage. Likewise as the voltage at the input 136 decreases below a second preselected voltage, the voltage at the output transitions from the second voltage to the first voltage. The use of the first and second preselected threshold voltages provides for hysteresis within the first comparator 120, as is described below. Accordingly, the first preselected voltage is preferably greater than the second preselected voltage.

In the non-limiting embodiment described herein, the output 140 of the first comparator is about VCC volts when the voltage at the input 136 is below about 0.7 volts. When the voltage at the input 136 exceeds a first preselected voltage of approximately 0.7 volts, the voltage at the output 140 steps to approximately zero volts or ground. The voltage at the output 140 stays at VCC until the voltage at the input 136 drops below a second preselected voltage of approximately 0.45 volts.

The second comparator 122 has an output 142 and may function in a similar manner as the first comparator 120. The voltage at the output 142 may be transitionable between a first voltage and a second voltage when the voltage at the input 138 exceeds a first preselected threshold voltage. The voltage at the output 142 may transition back to the first voltage when the voltage at the input decreases below a second preselected threshold voltage. The first preselected threshold voltage may, as a non-limiting example, be approximately 3.5 volts. The second preselected threshold voltage may, as a non-limiting example, be approximately 3.0 volts.

The switch controller 124 may have a first input 144 and a second input 146. The first input 144 of the switch controller 124 may be operatively connected to the output 140 of the first comparator 120 by a line 148. The second input 146 of the switch controller 124 may be operatively connected to the output 142 of the second comparator 122 by a line 150. The switch controller 124 may have an output 152 that is operatively connected to a control input 154 of the switch 126 by way of a line 156. As described in greater detail below, the switch controller 124 may, as non-limiting examples, be a one shot device or a monostable multivibrator.

The switch 126 may have first terminal 160 and a second terminal 162 in addition to the control input 154. When the voltage at the control input 154 of the switch 126 is at a first potential, an electrical connection may exist between the first terminal 160 and the second terminal 162. Accordingly, the switch 126 is closed when the voltage at the control input 154 is at the first potential. When the voltage at the control input 154 is at a second potential, the above-described electrical connection between the first terminal 160 and the second terminal 162 does not exist. Accordingly, the switch 126 is open when the voltage at the control input is at the second potential.

The first terminal 160 of the switch 126 may be operatively connected to the line 130 and, thus, the conductor 110.

The second terminal 162 of the switch 126 may be operatively connected to a resistor R2, which may be operatively connected to the voltage VCC. Thus, when the switch 126 is closed, the conductor 110 is connected to the voltage VCC via the resistor R2, which connects the resistor R2 in parallel with the resistor R1. Accordingly, the time constant of the conductor 110 is reduced. When the switch 126 is open, the resistor R2 is disconnected from the resistor R1 and the conductor 110 returns to its original time constant.

Having described a non-limiting embodiment of the components of the impedance changing circuit 100, the operation of the impedance changing circuit will now be described. A more detailed embodiment of the impedance changing circuit 100 will be described in detail further below.

As described above, the conductor 110 serves to transfer data between devices operatively connected to the conductor 110, such as the device 112 and other devices, not shown. In the non-limiting embodiment described herein, the conductor 110 is a conductor used in an I²C bus. Therefore, the conductor 110 may be either the serial clock line or the serial data line. A circuit, not shown, that is identical to the impedance changing circuit 100 may be operatively connected to the other line of the I²C bus.

As described in greater detail below, the impedance changing circuit 100 senses the voltage transition on the conductor 110 between a low voltage and a high voltage. The impedance changing circuit 100 then causes the resistor R2 to be connected in parallel to the conductor 110 for a short period during the transition between the low voltage and the high voltage. The connection of the resistor R2 to the conductor 110 causes the resistor R2 to be in parallel with the resistor R1. The parallel connection of the resistor R2 to the resistor R1 decreases the time constant associated with the conductor 110. Accordingly, the time response of the conductor 110 is decreased and the voltage on the conductor 110 is able to transition between a low voltage and a high voltage at a faster rate. This, in turn, enables the data bus to function properly with a high capacitance. For example, the data bus can function properly with longer conductors and with more devices connected to the conductor 110.

The first voltage comparator 120 monitors the voltage on the conductor 110. The voltage at the output 140 transitions from the first voltage to the second voltage as the voltage on the conductor 110 exceeds the first preselected threshold voltage. Because the first preselected voltage is very low, the voltage at the output 140 transitions to the second voltage as the voltage on the conductor 110 starts to transition from a low voltage to a high voltage. In the non-limiting example provided herein, as the voltage on the conductor 110 rises above the first preselected threshold voltage of 0.7 volts, the voltage at the output 140 transitions from a high state to a low state.

Hysteresis within the first voltage comparator 120 lessens the likelihood that the voltage at the output 140 will oscillate as the voltage at the input 136 increases and exceeds the first preselected threshold voltage. In the non-limiting example provided herein, the voltage at the output 140 of the comparator 120 will remain in the low state until the voltage at the input 136 of the first voltage comparator 120 drops below second preselected threshold voltage of approximately 0.45 volts. The amount of the hysteresis is greater than noise or other irregularities on the conductor 110. Therefore, the comparator 120 will not detect them as true voltage transitions on the conductor 110.

The transition from a high state to a low state on the first input 144 of the switch controller 124 causes it to output a voltage on the line 156 that closes the switch 126. When the switch 126 is closed, the resistor R2 is connected in parallel with the resistor R1. Accordingly, the resistance associated with the conductor 110 is reduced, which reduces the time constant of the conductor 110. The reduced time constant decreases the response time of the conductor 110, which compensates for a response time that may have been increased due to excessive capacitance C1. Accordingly, the transition time from a low voltage state to a high voltage state is reduced.

As the voltage on the conductor 110 continues to rise, it eventually exceeds the first preselected threshold voltage of the second voltage comparator 122. When the first preselected threshold voltage of the second voltage comparator 122 is exceeded, the voltage at the output 142 transitions from a high state to a low state. The second voltage comparator 122 may have hysteresis associated therewith to prevent the voltage at the output 142 from oscillating as the voltage at the input 138 exceeds the first preselected threshold voltage of the second voltage comparator 122. The hysteresis also prevents noise and other voltage transitions from causing the output of the second voltage comparator 122 to transition.

When the voltage at the output 142 of the second voltage comparator 122 transitions from the high state to the low state, the voltage at the output 152 of the switch controller 124 transitions. This voltage transition at the output 152 of the switch controller 124 causes the switch 126 to open. Accordingly, the resistor R2 is disconnected from the conductor 110 and the conductor 110 is returned to its original time constant.

Having described the impedance changing circuit 100 of FIG. 1, a more detailed embodiment of the impedance changing circuit 100 will now be described with reference to FIG. 2. It should be noted that some of the block components of FIG. 1 are shown in greater detail in FIG. 2.

The first voltage comparator 120 may have a first voltage comparator U1 with associated components connected thereto. In one non-limiting embodiment of the impedance changing circuit 100, the first voltage comparator U1 is of the type commonly known as an LT1721CS. A resistor R3 is connected between the line 132 and the inverting input to the first voltage comparator U1. A capacitor C1 is connected between the inverting input of the first voltage comparator U1 and ground. The combination of the resistor R3 and the capacitor C1 serves as a noise filter to prevent the first voltage comparator 120 from transitioning due to noise on the line 132.

The first voltage comparator 120 has a voltage divider consisting of a series connection of a resistor R4 and a resistor R5 connected between the voltage VCC and ground. The voltage divider provides for a direct current bias at the non-inverting input of the first voltage comparator U1. The biasing at the non-inverting input of the first voltage comparator U1 provides for the output of the first voltage comparator U1 to transition upon the input to the first voltage comparator 120 exceeding a threshold voltage of approximately 0.7 volts. A capacitor C2 is connected between the non-inverting input of the first voltage comparator U1 and ground. The capacitor C2 serves to attenuate noise within the first voltage comparator 120. A resistor R6 is connected between the non-inverting input of the first voltage comparator U1 and the output of the first voltage comparator U1. The resistor R6 serves to provide hysteresis within the first voltage comparator 120. More specifically, the hysteresis prevents the output voltage of the first comparator 120 from transitioning to a high state until the voltage on the comparator drops below approximately 0.45 volts.

The output of the first voltage comparator U1 is connected to the switch controller 124. The switch controller 124 consists of a monostable multivibrator U2 and its associated components, wherein the output of the first voltage comparator U1 is connected to a B input of the monostable multivibrator U2.

The second voltage comparator 122 is configured in a similar manner as the first voltage comparator 120. The second voltage comparator 122 comprises a second voltage comparator U3 and its associated components. A resistor R10 is connected between the line 132 and the inverting input of the second voltage comparator U3. A resistor R11 is connected between the inverting input of the second voltage comparator U3 and ground. The series combination of the resistor R10 and the resistor R11 serves as a voltage divider to reduce the voltage at the inverting input of the second voltage comparator U3.

A resistor R12 and a resistor R13 are connected in series between the voltage VCC and ground. The node where the resistor R12 and the resistor R13 are connected is connected to the non-inverting input to the second voltage comparator U3. The series combination of the resistor R12 and the resistor R13 serves to create a direct current bias voltage at the non-inverting input of the second voltage comparator U3. The biasing at the non-inverting input of the second voltage comparator U3 provides for the output of the second voltage comparator U3 to transition upon the input to the second voltage comparator 122 exceeding a threshold voltage of approximately 3.5 volts. A resistor R13 is connected between the non-inverting input of the second voltage comparator U3 and the output of the second voltage comparator U3. The resistor R13 provides hysteresis for the second voltage comparator 122. More specifically, the output voltage of the second voltage comparator 122 remains low until the voltage on the conductor 110 drops below approximately 3.0 volts.

The output of the second voltage comparator U3 is connected to a clear input CLR of the monostable multivibrator U2. The monostable multivibrator U2 may, as a non-limiting example, be of the type known as a 74HC4538. In one embodiment of the impedance changing circuit 100, a one shot device is used in place of the monostable multivibrator U2. In the non-limiting embodiment of the impedance changing circuit 100 described herein, the monostable multivibrator U2 has an output Q that is connected to an input A. In addition, a capacitor C3 is connected between a terminal T1 and a terminal T2. A resistor R16 is connected between the voltage VCC and the terminal T2. As will be described in greater detail, the combination of the resistor R16 and the capacitor C3 provide for the monostable multivibrator to output a voltage pulse having a preselected period.

An output of the monostable multivibrator U2, Q not, is operatively connected to the gate of a MOSFET Q1. The gate of the Q1 is also connected to a pull up resistor R15, which is connected to the voltage VCC. The source of the MOSFET Q1 is connected to the voltage VCC. The drain of the MOSFET Q1 is connected to the resistor R2, which in turn is connected to the conductor 110. In the non-limiting embodiment of the impedance changing circuit 100 described herein, the MOSFET Q1 is a p-channel device known as an NDS0610.

Having described the components of the impedance changing circuit 100, the operation of the impedance changing circuit 100 will now be described.

In the non-limiting embodiment of the impedance changing circuit 100 described herein, the conductor 110 is a line or conductor of an $I^2C$ bus. The $I^2C$ bus uses two conductors, a serial data line and a serial clock line, that serve to transfer data between devices connected to the bus. The impedance changing circuit 100 may be connected to either the serial data line or the serial clock line. Another impedance changing circuit may be connected to the other line. It should be noted that the circuit and the methods described herein are applicable to other data bus architectures.

In the $I^2C$ format, voltage transitions occur on the lines by a device pulling a line low and letting the line float high. Proper data transmission requires the voltages on the data lines float to high states within a specified period. Accordingly, excessive time constants associated with the conductors of the data bus may cause the voltage on one line to float high too slowly for proper data transmission. The impedance changing circuit 100 described herein reduces the time constant associated with a conductor as the voltage on the conductor floats high. Accordingly, the voltage on the conductor floats to a high level in a reduced time.

When the voltage on the conductor 110 is at a low potential, sometimes simply referred to as low, the voltage on the line 132 is low as well as the voltages at the inverting inputs to the first voltage comparator U1 and the second voltage comparator U3. The non-inverting inputs of the first voltage comparator U1 and the second voltage comparator U3 are biased positive, therefore, the outputs of the first voltage comparator U1 and the second voltage comparator U3 are at high potentials, sometimes simply referred to as high. Accordingly, the output Q not of the monostable multivibrator U2 is high. It should be noted that the pull up resistor R15 assures that the output Q not is high. For example, even when the output Q not is driven high, the voltage may not be high enough to turn off the MOSFET Q1. The pull up resistor R15 assures that the output Q not is approximately VCC volts so as to turn off the MOSFET Q1.

The high voltage at the output Q not of the monostable multivibrator U2 causes a very low source to gate voltage on the MOSFET Q1. Thus, the MOSFET Q1 is off and functions as an open switch. This operational state of the MOSFET Q1 electrically isolates the resistor R1 from the conductor 110.

As the voltage on the conductor 110 rises, the voltages at the inverting inputs of the first voltage comparator U1 and the second voltage comparator U3 rise. When the voltage on the conductor 110 reaches the threshold voltage of the first voltage comparator U1, the output voltage of the first voltage comparator U1 transitions. As described above, this transition occurs as the voltage on the conductor 110 exceeds approximately 0.7 volts. In the non-limiting embodiment described herein, the output voltage of the first voltage comparator U1 transitions from a high voltage to a low voltage. Accordingly, the voltage at the B input of the monostable multivibrator U2 transitions from a high voltage to a low voltage.

The voltage transition at the B input of the monostable multivibrator U2 causes the voltage at the output Q not to go low for a preselected period. In the non-limiting embodiment described herein, the voltage at the output Q not transitions low for a period of approximately 0.7 microseconds (0.7×C3×R16). During the period that the output voltage at the output Q not is low, the source to gate voltage of the MOSFET Q1 is high and the MOSFET Q1 conducts similar to a closed switch. The resistor R2 is connected in parallel with the resistor R1 during this period. The parallel connection of the resistor R2 reduces the resistance associated with the conductor 110, which in turn reduces the time constant associated with the conductor 110. The reduced time constant decreases the time response associated with the conductor 110. Accordingly, the rise time of a voltage on the conductor 110 is reduced. Therefore, the conductor 110 may operate properly even with excessive capacitance associated with the conductor 110 sufficient to raise the time constant of the conductor 110.

As the voltage on the conductor 110 continues to rise, it eventually reaches the threshold voltage of the second voltage comparator U3. As described above, the threshold occurs when the voltage on the conductor 110 exceeds approximately 3.5 volts. When this threshold voltage is reached, the output voltage of the second voltage comparator U3 transitions. In the non-limiting example provided herein, the output voltage of the second voltage comparator U3 transitions from a high voltage to a low voltage. Accordingly, the clear input CLR of the monostable multivibrator U2 transitions from a high voltage to a low voltage.

The transition from a high voltage to a low voltage at the clear input CLR of the monostable multivibrator U2 causes the voltage at the output Q not to be driven high regardless of the voltage at the B input of the monostable multivibrator U2. Accordingly, the source to gate voltage on the MOSFET Q1 is low and the MOSFET Q1 functions as an open switch to electrically isolate the resistor R2 from the conductor 110. Thus, the time constant associated with the conductor 110 is returned to its original value.

The impedance changing circuit 100 uses the above-described timer associated with the monostable multivibrator U2 to assure that the voltage at the output Q not returns to a high state within a preselected period. In the non-limiting example provided herein, the timer has a period of approximately 0.7 microseconds. Therefore, the output Q not will remain low for a maximum period of 0.7 microseconds. This assures that the time constant of the conductor 110 is returned to its original state regardless of the operation of the impedance changing circuit 100. For example, should the second voltage comparator 122 fail to detect the rise in the voltage on the conductor 110, the timer will assure that the conductor 110 is returned to its original time constant.

Figure 2:
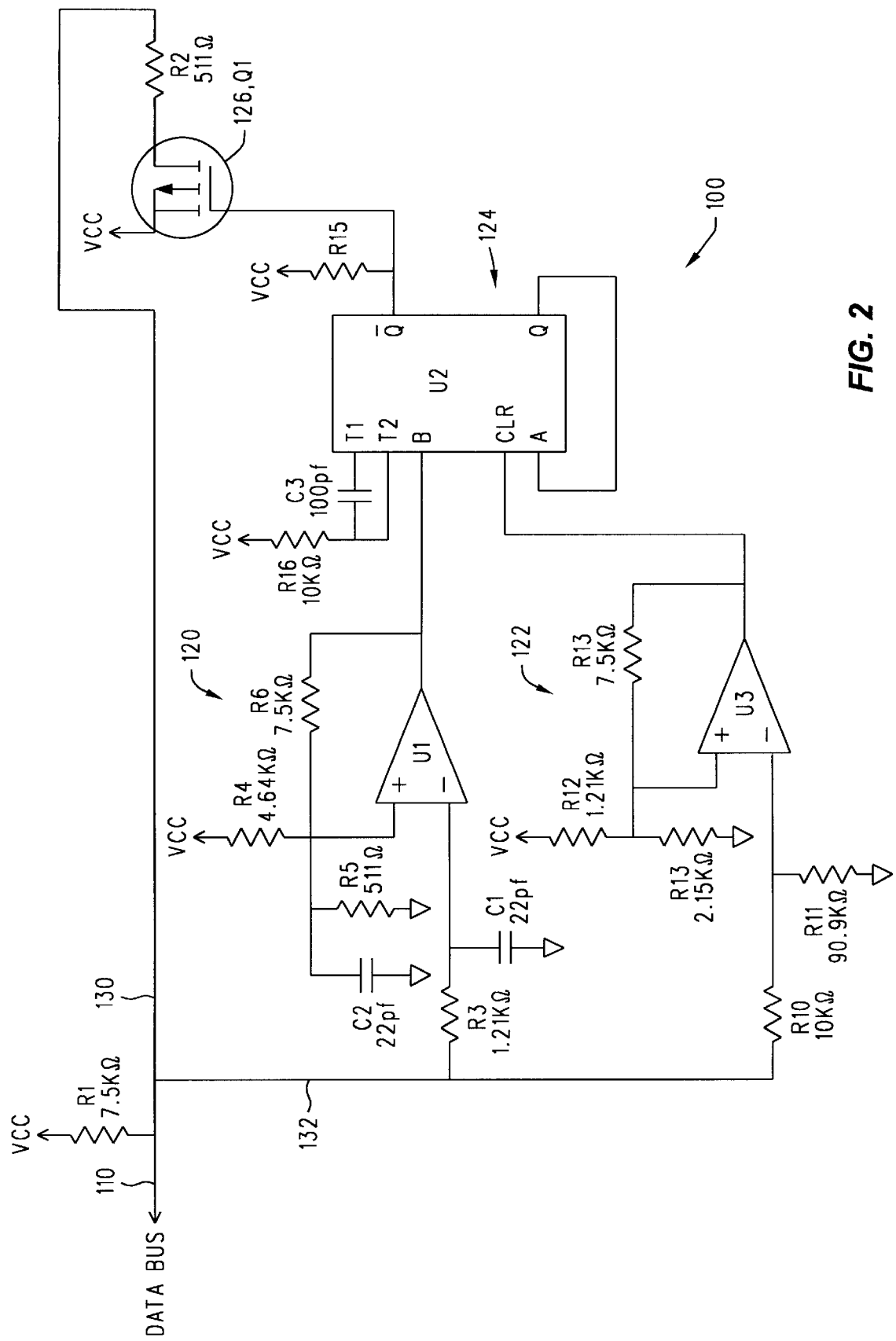
FIG. 2 is a more detailed schematic diagram of the device of FIG. 1.
Figure 3:
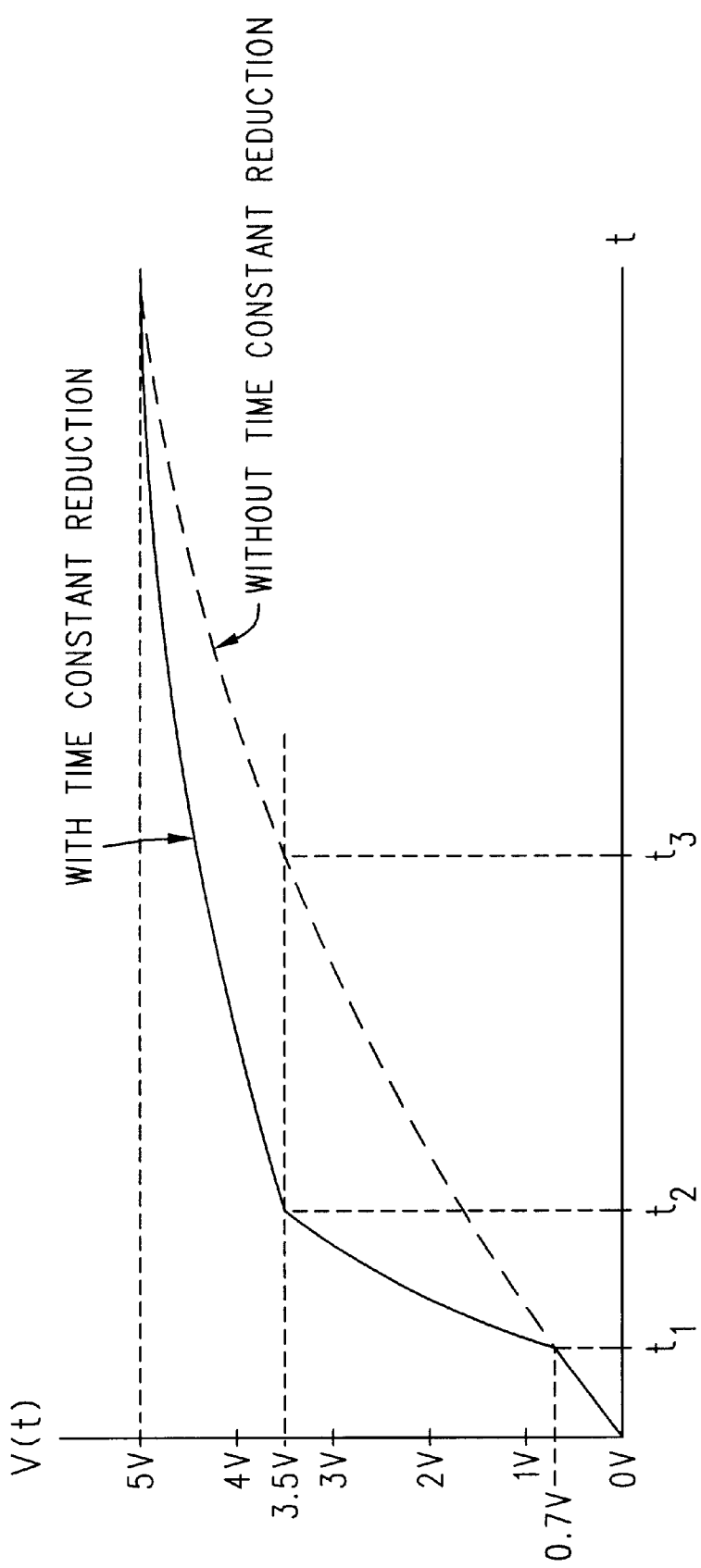
FIG. 3 is an exemplary graph illustrating the impact of the device of FIG. 1 on rise time performance.

A non-limiting example of the impact of the impedance changing circuit 100 on the data bus is illustrated by the graph of FIG. 2. The dashed line shows the voltage on the conductor rising without the impedance changing circuit 110 connected thereto. The solid line shows the voltage on the conductor 110 with the impedance changing circuit 100 attached thereto. As shown in FIG. 3, in both cases a time of $t_1$ is required for the voltage on the conductor 110 to rise to approximately 0.7 volts. At this point, the time constant is reduced in the situation where the conductor 110 is connected to the impedance changing circuit 100. In the example described therein the voltage on the conductor 110 connected to the impedance changing circuit 100 rises to approximately 3.5 volts at a time $t_2$. The voltage on the conductor not connected to the impedance changing circuit 100 rises to approximately 3.5 volts at a time $t_3$, which is significantly longer than the time $t_2$. Accordingly, the impedance changing circuit 100 has improved the rise time performance of the data bus.

Having described an embodiment of the impedance changing circuit 100, other embodiments will now be described.

In the impedance changing circuit 100 described above, the monostable multivibrator U2 controls the operation of the MOSFET Q1. This configuration has the advantage of providing a pulse from the output Q not to the gate of the MOSFET Q1, wherein the MOSFET Q1 conducts during the period of the pulse. Therefore, the voltage at the output Q not will eventually return to the high state regardless of whether the second voltage comparator U3 can reset the monostable multivibrator U2. This serves as a safeguard in case the second voltage comparator U3, for whatever reason, is not able to reset the monostable multivibrator U2.

In one embodiment of the impedance changing circuit 100, a flip-flop circuit or the like is used to control the operation of the MOSFET Q1 rather than the monostable multivibrator U2. The flip-flop circuit normally drives the gate of the MOSFET Q1 high relative to ground, which turns off the MOSFET Q1 and electrically isolates the resistor R2 from the conductor 110. When the voltage on the conductor 110 exceeds the threshold voltage of the first voltage comparator 120, the output voltage of the flip-flop transitions and the voltage on the gate of the MOSFET Q1 transitions low relative to ground. Accordingly, the MOSFET Q1 conducts as was described above to connect the resistor R2 in parallel with the resistor R1. In this embodiment, the MOSFET Q1 continues to conduct until the second voltage comparator 122 causes the output voltage of the flip-flop to transition again. This second transition occurs when the voltage on the conductor 110 exceeds the threshold voltage of the second voltage comparator 122. The second transition causes the flip-flop circuit to turn the MOSFET Q1 off which isolates the resistor R2 from the conductor 110.

The impedance changing circuit 100 has been described as using the first voltage comparator U1 and the second voltage comparator U3 to monitor the voltage on the conductor 110. Other voltage monitoring devices may be used in place of the voltage comparators described herein. For example, differential amplifiers having high gain may be used as voltage comparators. In addition, the hysteresis associated with the first voltage comparator U1 and the second voltage comparator U3 may be eliminated in one embodiment. As described above, hysteresis is used to prevent the first voltage comparator U1 and the second voltage comparator U3 from oscillating as the voltage on the conductor 110 passes through their threshold voltages.

In other embodiments of the impedance changing circuit 100, switching devices other than the MOSFET Q1 may be used. For example, a bipolar transistor or a solid state switching device may be used to connect the resistor R2 to the conductor 110.

In another embodiment of the impedance changing circuit 100, the second voltage comparator U3 is removed. In this embodiment, the first voltage comparator U1 triggers the monostable multivibrator U2 to cause the MOSFET Q1 to conduct for a preselected period. At the termination of the preselected period, the monostable multivibrator U2 causes the MOSFET Q1 to open. In the example of the impedance changing circuit 100 described above, the monostable multivibrator U2 will cause the MOSFET Q1 to conduct for a maximum period of approximately 0.7 microseconds. Accordingly, if the second voltage comparator U3 is removed, the MOSFET Q1 will still only conduct for a maximum period of 0.7 microseconds.

The impedance changing circuit 100 has been described herein as reducing the time constant of the conductor 110 as the voltage on the data bus transitions from a low voltage to a high voltage. The impedance changing circuit 100 described herein may be readily modified so as to reduce the time constant of the conductor 110 as the voltage on the data bus transitions from a high voltage to a low voltage.

What is claimed is:

1. A device for reducing the time constant of a system having a conductor connected thereto as a voltage on said conductor transitions between two voltages, said device comprising:
   a first voltage comparator, the input of which is operatively connected to said conductor, the voltage at a first voltage comparator output being transitionable between a first voltage and a second voltage when the voltage of said conductor exceeds a first preselected voltage;
   an impedance;
   a switch operatively connected to said first voltage comparator output and said impedance, said switch connecting said impedance to said conductor when said switch is in a first switch state, said switch not connecting said impedance to said conductor when said switch is in a second switch state;
   a timer operatively connected to said switch and said first voltage comparator, said timer transitionable from a timer first state to a timer second state for a preselected period upon the transition of the voltage at said first voltage comparator output from a first voltage to a second voltage;
   said first switch state occurring when said voltage at said first voltage comparator output transitions from said first voltage to said second voltage; and
   said second switch state occurring when said timer transitions to said second timer state.

2. The device of claim 1 and further comprising:
   a second voltage comparator comprising a second voltage comparator input being operatively connected to said conductor, the voltage at a second voltage comparator output being transitionable between a third voltage and a fourth voltage when the voltage of said conductor exceeds a second preselected voltage; and
   said second voltage comparator being operatively connected to said switch.

3. The device of claim 2, wherein said switch second state occurs when either said timer transitions to said second timer state or said voltage at said second voltage comparator output transitions to said fourth voltage.

4. The device of claim 2, wherein said second preselected voltage is about 3.5 volts.

5. The device of claim 1, wherein said first preselected voltage is about 0.7 volts.

6. The device of claim 1, wherein said timer comprises a monostable multivibrator.

7. The device of claim 1, wherein said switch comprises a MOSFET.

8. The device of claim 1, wherein said timer comprises a one shot device and wherein said switch comprises a MOSFET; said one shot device having a first trigger input operatively connected to said first voltage comparator output; said one shot device having an output operatively connected to the gate of said MOSFET; the source of said MOSFET being operatively connected to a preselected voltage potential; the drain of said MOSFET being operatively connected to said impedance.

9. The device of claim 1, wherein said conductor is a line of an inter-integrated circuit bus.

10. The device of claim 1, wherein said impedance is resistive.

11. The device of claim 1, wherein said impedance has a value of about 511 ohms.

12. A device for reducing the time constant of a system having a conductor connected thereto as a voltage on said conductor transitions between two potentials, said device comprising:
   a first voltage comparator, the input of which is operatively connected to said conductor, the voltage at said first voltage comparator output being transitionable between a first voltage and a second voltage when the voltage of said conductor exceeds a first preselected voltage;
   a second voltage comparator, the input of which is operatively connected to said conductor, the voltage at said second voltage comparator output being transitionable between a third voltage and a fourth voltage when the voltage of said conductor exceeds a second preselected voltage;
   an impedance; and
   a switch operatively connected to said first voltage comparator output, said second comparator output, and said impedance, said switch connecting said impedance in parallel with said conductor when said switch is in a first operative state, said switch not connecting said impedance in parallel with said conductor when said switch is in a second operative state;
   said first operative state of said switch occurring when said voltage at said first voltage comparator output transitions from said first voltage to said second voltage; and
   said second operative state of said switch occurring when said voltage at said second voltage comparator output transitions from said third voltage to said fourth voltage.

13. The device of claim 12, wherein said switch comprises a monostable multivibrator.

14. The device of claim 12, wherein said switch comprises a MOSFET.

15. The device of claim 12, wherein said switch comprises a one shot device operatively connected to a MOSFET; said one shot device having a first trigger input operatively connected to said first voltage comparator output; said one shot device having a reset operatively connected to said second voltage comparator output; said one shot device having a first output operative connected to the gate of said MOSFET; the source of said MOSFET being operatively connected to a preselected voltage potential; the drain of said MOSFET being operatively connected to said impedance.

16. The device of claim 12, wherein said conductor is a line of a data bus.

17. The device of claim 12, wherein said conductor is a line of an inter-integrated circuit bus.

18. The device of claim 12, wherein said first preselected voltage is about 0.7 volts.

19. The device of claim 12, wherein said second preselected voltage is about 3.5 volts.

20. The device of claim 12, wherein said impedance is resistive.

21. The device of claim 12, wherein said impedance has a value of about 511 ohms.

22. The device of claim 12 and further comprising a timer operatively connected to said switch and said first voltage comparator; said timer transitionable from a timer first state to a timer second state for a preselected period upon the transition of the voltage at said first voltage comparator output from said first voltage to said second voltage;
   said switch second operative state occurring when either said timer transitions to said second timer state or said voltage at said second voltage comparator output transitions to said fourth voltage.

23. A method for reducing the time constant of a system having a conductor connected thereto as a voltage on said conductor transitions from a low potential to a high potential, wherein a first impedance is connected between said conductor and a potential, said method comprising:

monitoring the voltage on said conductor;

connecting a second impedance in parallel with said first impedance when said voltage on said conductor exceeds a first preselected value; and disconnecting said second impedance from said first impedance when said voltage on said conductor exceeds a second preselected value.

24. The method of claim 23, wherein said step of connecting further comprises connecting a second impedance in parallel with said first impedance when said voltage on said conductor exceeds approximately 0.7 volts.

25. The method of claim 23, wherein said step of disconnecting further comprises disconnecting said second impedance from said first impedance when said voltage on said conductor exceeds approximately 3.5 volts.

26. The method of claim 23, wherein said step of disconnecting further comprises disconnecting said second impedance from said first impedance after a preselected period.

27. The method of claim 23, wherein said step of disconnecting further comprises disconnecting said second impedance from said first impedance after a period of approximately seven hundred nanoseconds.

28. A device for reducing the time constant of a system having a conductor connected thereto as a voltage on said conductor transitions between two potentials, said device comprising:

monitoring means for monitoring the voltage on said conductor; and connecting means for connecting an impedance between said conductor and a potential when said voltage on said conductor exceeds a first preselected value;

wherein said connecting means is further for disconnecting said impedance from said conductor when said voltage on said conductor exceeds a second preselected value.

29. The device of claim 28, wherein said connecting means is further operable for disconnecting said impedance from said conductor after a preselected period.

* * * * *